United States Patent
Higashihara et al.

(10) Patent No.: US 7,787,635 B2
(45) Date of Patent: Aug. 31, 2010

(54) DIP FILTER FREQUENCY CHARACTERISTIC DECISION METHOD

(75) Inventors: Daisuke Higashihara, Hyogo (JP); Shokichiro Hino, Tokyo (JP); Koichi Tsuchiya, Tokyo (JP); Tomohiko Endo, Tokyo (JP)

(73) Assignees: Toa Corporation, Kobe-shi (JP); Etani Electronics Co., Ltd., Tokyo (JP)

( * ) Notice: Subject to any disclaimer, the term of this patent is extended or adjusted under 35 U.S.C. 154(b) by 693 days.

(21) Appl. No.: 10/547,123

(22) PCT Filed: Feb. 24, 2004

(86) PCT No.: PCT/JP2004/002141

§ 371 (c)(1),
(2), (4) Date: Apr. 26, 2006

(87) PCT Pub. No.: WO2004/077402

PCT Pub. Date: Sep. 10, 2004

(65) Prior Publication Data

US 2006/0251264 A1    Nov. 9, 2006

(30) Foreign Application Priority Data

Feb. 27, 2003    (JP) ............................. 2003-051147

(51) Int. Cl.
H04B 3/20    (2006.01)
(52) U.S. Cl. ............................. 381/66; 381/61; 381/98
(58) Field of Classification Search ............. 381/56–59, 381/61–66, 98–109, 71.1–71.14, 94.1–94.8, 381/83, 93

See application file for complete search history.

(56) References Cited

U.S. PATENT DOCUMENTS

| 3,624,298 | A | * | 11/1971 | Davis et al. | 381/66 |
| 4,232,192 | A | * | 11/1980 | Beex | 381/83 |
| 5,581,621 | A | * | 12/1996 | Koyama et al. | 381/103 |
| 6,067,362 | A | * | 5/2000 | Lemanski et al. | 381/94.1 |

(Continued)

FOREIGN PATENT DOCUMENTS

JP    59-094994    5/1984

(Continued)

OTHER PUBLICATIONS

International Search Report for PCT/JP2004/002141 by the Japanese Patent Office dated Jun. 8, 2004 (2 pages).

*Primary Examiner*—Vivian Chin
*Assistant Examiner*—Fatimat O Olaniran
(74) *Attorney, Agent, or Firm*—Marshall, Gerstein & Borun LLP (57) ABSTRACT

Resonant frequencies f2 and f3 detected in a resonant space are determined as center frequencies of a dip. Based on measurement values at a speaker and a microphone in the resonant space, a basic amplitude frequency characteristic Ca and a target amplitude frequency characteristic Cd are found. A smoothness degree on a frequency axis is larger in the target amplitude frequency characteristic Cd than the basic amplitude frequency characteristic Ca. A damping level and quality factor of the dip are determined based on a difference between the basic amplitude frequency characteristic Ca and the target amplitude frequency characteristic Cd in the center frequencies f2 and f3 of the dip and frequencies near the center frequencies.

3 Claims, 7 Drawing Sheets

U.S. PATENT DOCUMENTS

| | | |
|---|---|---|
| 6,072,879 A * | 6/2000 | Ouchi et al. ............... 381/61 |
| 6,760,451 B1 * | 7/2004 | Craven et al. ............. 381/98 |
| 6,876,750 B2 * | 4/2005 | Allred et al. ............. 381/314 |
| 7,249,511 B2 * | 7/2007 | Higashihara ............. 73/579 |
| 7,266,205 B2 * | 9/2007 | Miller ..................... 381/103 |
| 2004/0125963 A1 * | 7/2004 | Willis ..................... 381/66 |

FOREIGN PATENT DOCUMENTS

| | | |
|---|---|---|
| JP | 08-019088 | 1/1996 |
| JP | 08-130792 | 5/1996 |
| JP | 09-275597 | 10/1997 |
| JP | 11-127496 | 5/1999 |
| JP | 2000-354292 | 12/2000 |
| JP | 2001-285986 | 10/2001 |

\* cited by examiner

DIP FILTER FREQUENCY CHARACTERISTIC DECISION METHOD

The present application claims the benefit of priority of International Patent Application No. PCT/JP2004/002141 filed on Feb. 24, 2004, which application claims priority of Japanese Patent Application No. 2003-51147 filed Feb. 27, 2003. The entire text of the priority application is incorporated herein by reference in its entirety.

TECHNICAL FIELD

The present invention relates to a method of determining a frequency characteristic of a dip filter used for preventing resonance in a space in which acoustic equipment is installed.

BACKGROUND ART

For example, when acoustic equipment such as a speaker is installed in a hall or a gymnasium to radiate a loud sound wave from the speaker, music or voice from the speaker is sometimes difficult to listen to because of the presence of a resonant frequency in this space (loud sound space in which the acoustic equipment is installed). To be specific, if the loud sound wave from the speaker contains a component of the resonant frequency in large amount, resonance occurs in a frequency of this component in the loud sound space. A resonant sound is like "won . . . " or "fan . . . . " The resonant sound is not a sound wave to be radiated from the speaker and makes it difficult to listen to the music or the voice from the speaker.

To avoid this, the resonant frequency in the loud sound space is detected, and a dip filter or the like is provided at a forward stage of the speaker in the acoustic equipment to remove the component of the resonant frequency. Thereby, resonance is unlikely to occur in this loud sound space, making it easy to listen to the music or the voice from the speaker.

In order to enable the dip filter to give such effects, it is necessary to determine a frequency characteristic of the dip filter so that the resonant frequency in this loud sound space is a frequency to be removed.

Traditionally, an operator or a measuring person for the acoustic equipment distinguished the loud sound from the speaker or the resonant sound depending on their senses of hearing to make judgment of the resonant frequency, and the resonant frequency was set in the dip filter as the frequency to be removed. And, a damping level (depth) or quality factor (Q) of the dip filter was set so as to prevent resonance.

Even if the operator or the measuring person can distinguish the resonant frequency, it is not easy to set the frequency characteristic of the dip filter. In particular, it is not easy to appropriately set the damping level (depth) or the quality factor (Q) of the dip. The damping level of the dip is maximized (depth is maximized) and the quality factor is minimized (Q is minimized) if priority is given to only prevention of resonance. But, if the damping level becomes too high or the quality factor becomes too low, a sound quality of the acoustic equipment may be degraded, or music or voice may be difficult to listen.

Some skill or experience is required to set the damping level or the quality factor of the dip appropriately in order to avoid occurrence the above mentioned event. These factors (damping level or the quality factor of the dip) are not accurately set if the setting depends on the skill or experience. Furthermore, this has impeded automatic measurement and automatic adjustment of the acoustic equipment installed in the loud sound space or the like.

DISCLOSURE OF THE INVENTION

The present invention has been developed in view of the above described problems, and an object of the present invention is to provide a method of determining a frequency characteristic of a dip filter which is capable of accurately determining a characteristic of a dip filter without a need for experience or skills.

In order to solve the above mentioned problems, a method of determining a frequency characteristic of a dip filter of the present invention comprises determining a resonant frequency detected in a resonant space as a center frequency of a dip; finding a basic amplitude frequency characteristic based on a measurement value obtained by outputting a loud sound wave of a predetermined measurement signal from a speaker placed in the resonant space and by receiving the loud sound wave in a microphone placed in the resonant space; finding a target amplitude frequency characteristic having a smoothness degree on a frequency axis which is larger than a smoothness degree of the basic amplitude frequency characteristic on the frequency axis, based on the measurement value; and determining a damping level and/or quality factor of the dip based on a difference between the basic amplitude frequency characteristic and the target amplitude frequency characteristic in the center frequency and a frequency near the center frequency.

In accordance with this method, the amplitude frequency characteristic having the smoothness degree on the frequency axis that is larger than that of the basic amplitude frequency characteristic is assumed as the target amplitude frequency characteristic. Therefore, the target amplitude frequency characteristic is objectively found, and based on this, the damping level or quality factor of the dip are objectively determined.

In the above method, the target amplitude frequency characteristic may be obtained by smoothing according to any method, for example, by moving average of the measured amplitude frequency characteristic on the frequency axis.

The method may further comprise determining a damping level and/or quality factor of the dip so that a second area is substantially equal to a first area; wherein the first area is an area defined by a curve of the basic amplitude frequency characteristic and a curve of the target amplitude frequency characteristic in a frequency range from a first frequency to a second frequency when the curve of the basic amplitude frequency characteristic and the curve of the target amplitude frequency characteristic are represented in an amplitude frequency characteristic view in which a logarithm axis indicating an amplitude level is an ordinate axis and an axis indicating a frequency is an abscissa axis; wherein the first frequency is closest to the center frequency of the dip among frequencies at which the curve of the basic amplitude frequency characteristic and the curve of the target amplitude frequency characteristic cross each other, the frequencies being lower than the center frequency of the dip; wherein the second frequency is closest to the center frequency of the dip among frequencies at which the curve of the basic amplitude frequency characteristic and the curve of the target amplitude frequency characteristic cross each other, the frequencies being higher than the center frequency of the dip; and wherein the second area is an area of the dip formed when a characteristic of the dip is represented on the amplitude frequency characteristic view in which the logarithm axis indicating the amplitude level is the ordinate axis and the axis indicating the frequency is the abscissa axis.

In accordance with the above method, since the area formed by exceeding the basic amplitude frequency characteristic curve from the target amplitude frequency characteristic curve is substantially equal to the area of the dip, a characteristic near the target amplitude frequency characteristic is achieved by applying the characteristic of the dip to the basic amplitude frequency characteristic.

The method may further comprise determining the damping level of the dip so that the damping level substantially conforms to an amplitude level difference in the center frequency of the dip between the basic amplitude frequency characteristic and the target amplitude frequency characteristic; and determining the quality factor of the dip so that the second area is substantially equal to the first area.

By applying the characteristic of the dip determined by such a method to the basic amplitude frequency characteristic, a characteristic which is extremely near the target amplitude frequency characteristic is achieved.

The method may further comprise determining the center frequency of the dip in such a manner that a resonant frequency with the highest amplitude level of the second amplitude frequency characteristic is set as the center frequency of the dip among plural resonant frequencies and remaining resonant frequencies are not set as the center frequency of the dip when the plural resonant frequencies detected in the resonant space are included in the frequency range from the first frequency to the second frequency; wherein the second amplitude frequency characteristic is obtained by outputting, from the speaker, a loud sound wave of a synthesized signal containing the measurement signal and a signal output from the microphone and by receiving the loud sound wave in the microphone.

In accordance with this method, it is possible to avoid setting of unwanted dips in the dip filter.

The method may further comprises detecting the resonant frequency of the resonant space based on comparison between a first amplitude frequency characteristic and a second amplitude frequency characteristic; wherein the first amplitude frequency characteristic is obtained based on the measurement value; and wherein the second amplitude frequency characteristic is obtained by outputting, from the speaker, a loud sound wave of a synthesized signal containing the measurement signal and a signal output from the microphone and by receiving the loud sound wave in the microphone.

The second amplitude frequency characteristic according to this method is an amplitude frequency characteristic in a system including a feedback loop in which a signal output from a microphone is input to a speaker. This feedback loop causes the second amplitude frequency characteristic to show a noticeable effect of the resonance of the resonant space in contrast to the first amplitude frequency characteristic. Therefore, by comparing between the first amplitude frequency characteristic and the second amplitude frequency characteristic, the resonant frequency in the resonant space can be accurately detected.

In the method, a peak frequency at which an amplitude of the second amplitude frequency characteristic is larger than an amplitude of the first amplitude frequency characteristic may be detected as the resonant frequency of the resonant space, from a difference between the first amplitude frequency characteristic and the second amplitude frequency characteristic.

In the method, the measurement signal may be effective as a sine wave sweep signal.

These objects as well as other objects, features and advantages of the invention will become more apparent to those skilled in the art from the following description with reference to the accompanying drawings.

BEST MODE FOR CARRYING OUT THE INVENTION

A method of determining a frequency characteristic of a dip filter according to an embodiment of the present invention will be described with reference to the drawings.

Figure 1:
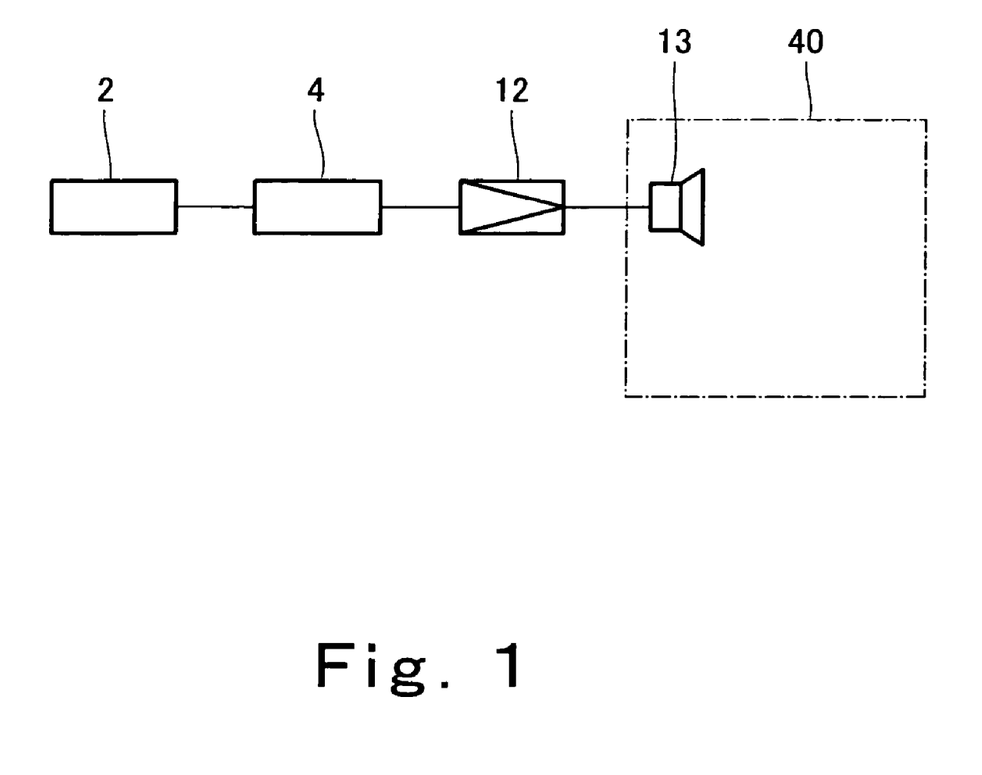
FIG. 1 is a schematic view of a construction of an acoustic system installed in a loud sound space.

FIG. 1 is a schematic view of a construction of an acoustic system installed in a loud sound space (e.g., concert hall or gymnasium) 40. The acoustic system comprises a sound source device 2, a dip filter 4, an amplifier 12, and a speaker 13. The sound source device 2 may be a music instrument such as a CD player for playback of, for example, music CD, or a microphone. While the sound source device 2 is illustrated as being located outside the loud sound space 40 in FIG. 1, it may alternatively be located within the loud sound space 40. The sound source device 2 may be, for example, a microphone installed within the loud sound space 40. The dip filter 4 serves to remove a signal component in a specified frequency from a signal output from the sound source device 2 and to output the resulting signal to the amplifier 12. The amplifier 12 amplifies the signal output from the dip filter 4 and outputs the amplified signal to the speaker 13, which outputs a loud sound wave in the loud sound space 40.

When the loud sound space 40 has a resonant frequency and the loud sound wave output from the speaker 13 contains a component of the resonant frequency in large amount, resonance occurs in the loud sound space 40 and thereby music or voice output from the speaker 13 is difficult to listen to. If an appropriate frequency characteristic is set in the dip filter 4 in this acoustic system, then the resonance in the loud sound space 40 is prevented without degrading a sound quality of the loud sound wave from the speaker 13.

In this embodiment, a frequency to be set in the dip filter 4 is determined. First of all, a method and device for detecting the resonant frequency in the resonant space 40 will be described with reference to FIGS. 2 to 5.

Figure 2:
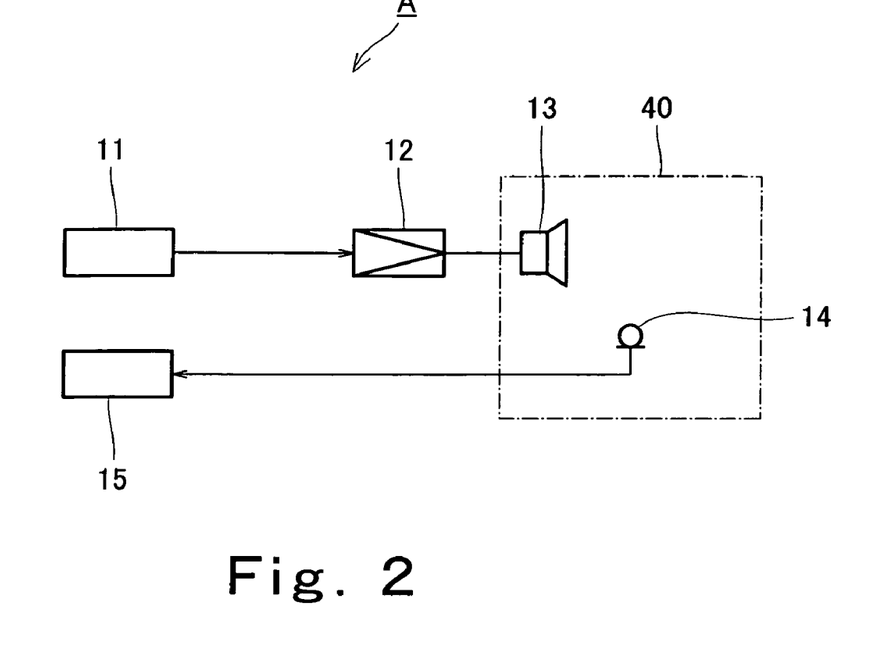
FIG. 2 is a schematic block diagram of a system for measuring an amplitude frequency characteristic of the loud sound space.

FIG. 2 is a schematic block diagram of a system A for measuring an amplitude frequency characteristic of the loud sound space (e.g., concert hall or gymnasium) 40. The system A comprises a transmitter 11 which is a sound source means configured to output a measurement signal, an amplifier 12 configured to receive, as an input, the signal output from the transmitter 11 and to power-amplify the signal, a speaker 13 configured to receive, as an input, the signal output from the amplifier 12 and to output a loud sound wave, a microphone 14 configured to receive the loud sound wave radiated from the speaker 13, and a meter 15 configured to receive, as an input, the sound wave from the microphone 14. The microphone 14 may be a noise meter.

The speaker 13 and the microphone 14 are placed within the loud sound space 40. The microphone 14 is positioned to be sufficiently distant from the speaker 13 within the loud sound space 40. The microphone 14 is positioned so as to receive a reflected sound of the sound wave directly output from the speaker 13 at a sufficiently high level within the loud sound space 40.

The transmitter 11 outputs, as the measurement signal, a sine wave signal whose frequency varies with time, i.e., a sine wave sweep signal. The sine wave sweep signal has a constant sine wave level at respective time points during frequency sweep.

The meter 15 has a band pass filter whose center frequency varies with time. The band pass filter varies the center frequency with time according to time variation of the frequency of the sine wave sweep signal output from the transmitter 11. Therefore, the meter 15 detects the level of the signal which has been received as an input from the microphone 14 and has passed through the band pass filter, thus measuring an amplitude characteristic of the frequency at that point of time.

Figure 3:
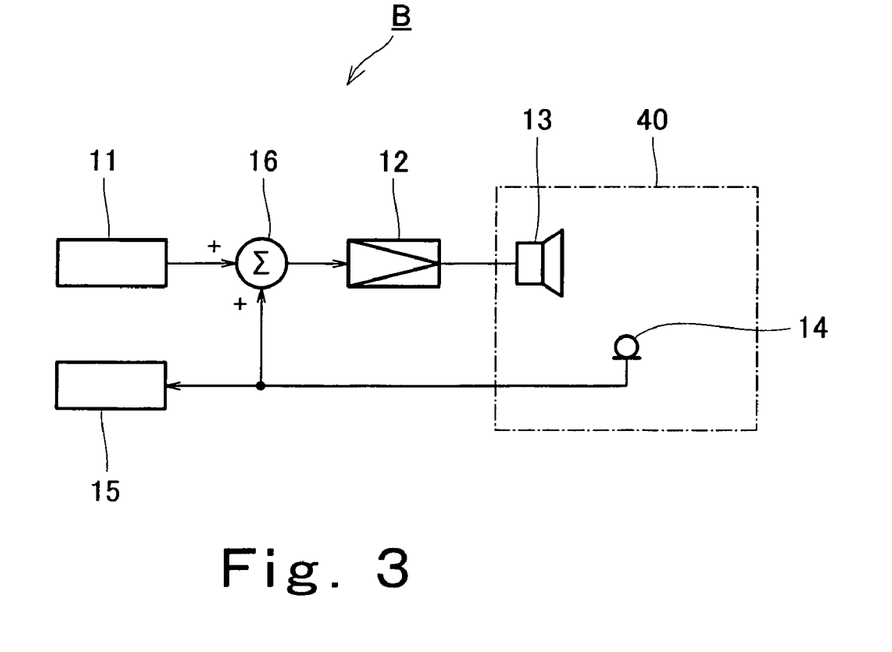
FIG. 3 is a schematic block diagram of a system for measuring an amplitude frequency characteristic of the loud sound space.

FIG. 3 is a schematic block diagram of a system B for measuring an amplitude frequency characteristic of the loud sound space 40. The system B is constructed such that a signal synthesization path is added to the system A of FIG. 2. To be specific, the system B of FIG. 3 comprises the transmitter 11 which is the sound source means configured to output the measurement signal, a mixer 16, the amplifier 12 configured to receive, as an input, a signal output from the mixer 16 and to power-amplify the signal, the speaker 13 configured to receive, as an input, the signal output from the amplifier 12 and to output a loud sound wave, the microphone 14 configured to receive the loud sound wave radiated from the speaker 13, and the meter 15 configured to receive, as an input, the sound wave output from the microphone 14.

The speaker 13 and the microphone 14 are placed at the same positions within the loud sound space 40 as those in the system A of FIG. 2. The transmitter 11, the amplifier 12, the speaker 13, the microphone 14, and the meter 15 in the system B of FIG. 3 are identical to those in the system A of FIG. 2.

The difference between the system B of FIG. 3 and the system A of FIG. 2 is that the amplifier 12 receives, as the input, the signal output from the transmitter 11 in the system A of FIG. 2, while the amplifier 12 receives, as the input, the signal output from the mixer 16 in the system B of FIG. 3. The mixer 16 of FIG. 3 receives, as inputs, the measurement signal (sine wave sweep signal) output from the transmitter 11 and the loud sound wave from the microphone 14, synthesizes (mix) these signals, and outputs a synthesized signal (mixed signal).

Thus far, the method of measuring the amplitude frequency characteristic of the loud sound space 40 in the system A of FIG. 2 and the method of measuring the amplitude frequency characteristic of the loud sound wave 40 in the system B of FIG. 3 have been described. Hereinbelow, the amplitude frequency characteristic of the loud sound space 40 which is measured by the system A of FIG. 2 is referred to as a first amplitude frequency characteristic and the amplitude frequency characteristic of the loud sound space 40 which is measured by the system B of FIG. 3 is referred to as a second amplitude frequency characteristic.

Figure 4:
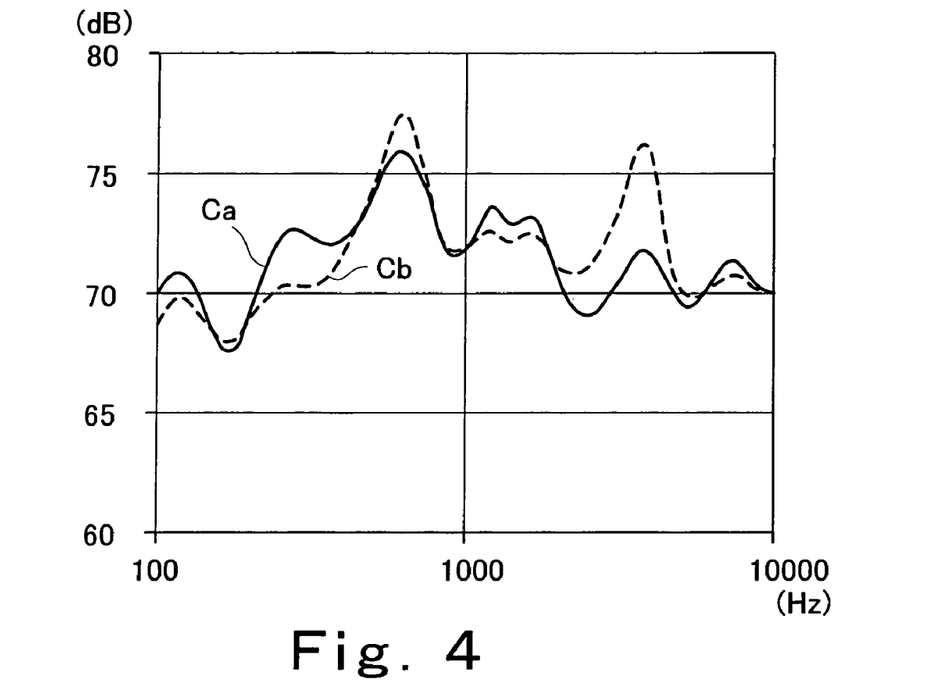
FIG. 4 is a view schematically showing a first amplitude frequency characteristic of the loud sound space which is measured by the system of FIG. 2 and a second amplitude frequency characteristic of the loud sound space which is measured by the system of FIG. 3.

FIG. 4 is a view of a frequency characteristic schematically showing a first amplitude frequency characteristic of the loud sound space 40 which is measured by the system A of FIG. 2 and the second amplitude frequency characteristic of the loud sound space 40 which is measured by the system B of FIG. 3. In FIG. 4, an ordinate axis and an abscissa axis are logarithmic axes and indicate an amplitude level and a frequency, respectively. As used herein, the term "amplitude level" refers to a logarithm of a ratio of an amplitude value (magnitude of amplitude) to a reference value (magnitude of reference), and is typically represented by "dB." In FIG. 4, a curve Ca indicated by a solid line is the first amplitude frequency characteristic measured by the system A of FIG. 2 and a curve Cb indicated by a broken line is the amplitude frequency characteristic measured by the system B of FIG. 3.

Both the system A of FIG. 2 and the system B of FIG. 3 measure amplitude values at a number of frequency points. For example, in a range of frequencies to be measured, the systems A and B measure the amplitude values at intervals of 1/192 octave. The measurement values at a number of points (a number of frequency points) may be indicated by the curves Ca and Cb as the first and second amplitude frequency characteristics of the loud sound space 40 without being smoothed on a frequency axis, or otherwise may be indicated by the curves Ca and Cb after they are smoothed on the frequency axis in some method or another. The measurement values may be smoothed in various methods, including moving average, for example. By way of example, moving average of 9 points may be performed for the measurement values at a number of frequency points on the frequency axis. When the smoothed measurement values are used as the curve Ca, the smoothed measurement values are desirably used as the curve Cb. In this case, the curve Cb is desirably obtained by the same smoothing method as the curve Ca. If the curve Ca is obtained by performing moving average of 9 points on the frequency axis, then the curve Cb is desirably obtained by performing moving average of 9 points on the frequency axis.

The first amplitude frequency characteristic indicated by the curve Ca of FIG. 4 contains the resonant characteristic of the loud sound space 40 as well as the characteristic of the acoustic system including the amplifier 12, the speaker 13, and the microphone 14. The second amplitude frequency characteristic indicated by the curve Cb of FIG. 4 also includes the resonant characteristic of the loud sound space 40 as well as the characteristic of the acoustic system including the amplifier 12, the speaker 13, and the microphone 14. The second amplitude frequency characteristic indicated by the curve Cb shows a noticeable effect of the resonant characteristic of the loud sound space 40 by a feedback loop in which the signal output from the microphone 14 is input to the amplifier 12 and is output from the speaker 13, in contrast to the first amplitude frequency characteristic of the curve Ca. Therefore, based on the difference between the curves (curve Ca and curve Cb), the resonant characteristic of the loud space 40 is known.

Figure 5:
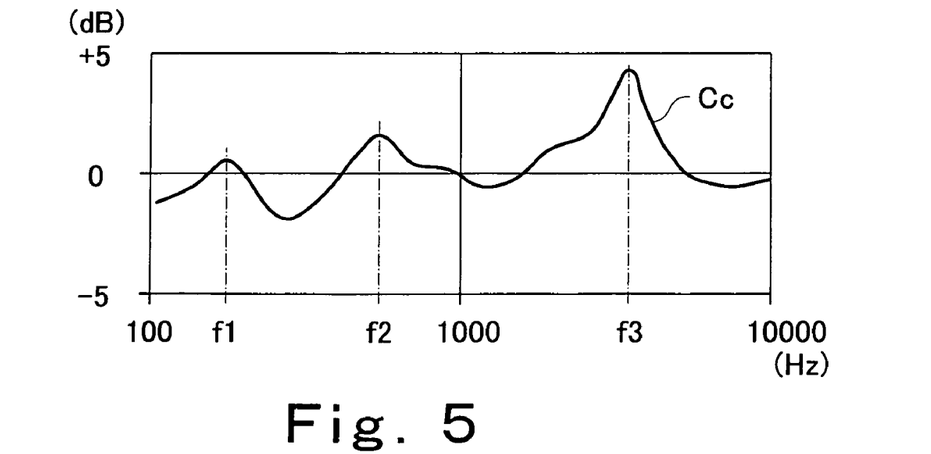
FIG. 5 is a view of a frequency characteristic showing an amplitude level difference between the first frequency characteristic of a curve Ca in FIG. 4 and the second frequency characteristic of a curve Cb in FIG. 4.

The frequency characteristic of FIG. 5 is obtained by subtracting the characteristic of the curve Ca from the characteristic of the curve Cb of FIG. 4, i.e., an amplitude level difference between the first amplitude frequency characteristic of the curve Ca and the second amplitude frequency characteristic of the curve Cb. In FIG. 5, frequencies having positive peaks in the curve Cc are frequencies f1, f2, and f3. It is probable that among these, the frequencies having larger peaks are resonant frequencies of the loud sound space 40. The possibility that the frequency f3 having the largest peak is the resonant frequency of the loud sound space 40 is the highest. The possibility that the frequency f2 having the second largest peak is the resonant frequency of the loud sound space 40 is the second highest. The number of resonant frequencies of the resonant space 40 is not limited to one, but may be in many cases more. This follows that one or more of the frequencies f1, f2, and f3 may be the resonant frequency. Based on the characteristic of FIG. 5, the frequencies which may be the resonant frequencies can be objectively detected.

Thus far, the method and device for detecting the resonant frequency in the resonant space 40 have been described with reference to FIGS. 2 to 5.

Subsequently, how to determine the frequency characteristic of the dip filter 4 of the acoustic system of FIG. 1 based on the resonant frequencies (frequencies f1, f2, and f3) detected as described above will be described.

The curve Ca of FIG. 4 is the first amplitude frequency characteristic of the loud sound space 40 which is obtained by the system A of FIG. 2. The resonant frequency is detected based on the curve Ca as described above. The characteristic of the curve Ca is hereinafter referred to as "basic amplitude frequency characteristic." Measurement values at a number of frequency points by the system A of FIG. 2 may be smoothed on the frequency axis or not to obtain the "basic amplitude frequency characteristic."

First, the frequencies f1, f2, and f3 are obtained as the frequencies having the positive peaks from the frequency characteristic curve Cc of FIG. 5. It is highly probable that these frequencies are the resonant frequencies in the loud sound space 40. From them, predetermined frequencies are selected as candidates for the dip center frequencies to be set in the dip filter 4 as frequencies to be removed.

Specifically, from these frequencies, candidate frequencies are selected in decreasing order of the amplitude levels in the curve Cb of FIG. 4.

Figure 6:
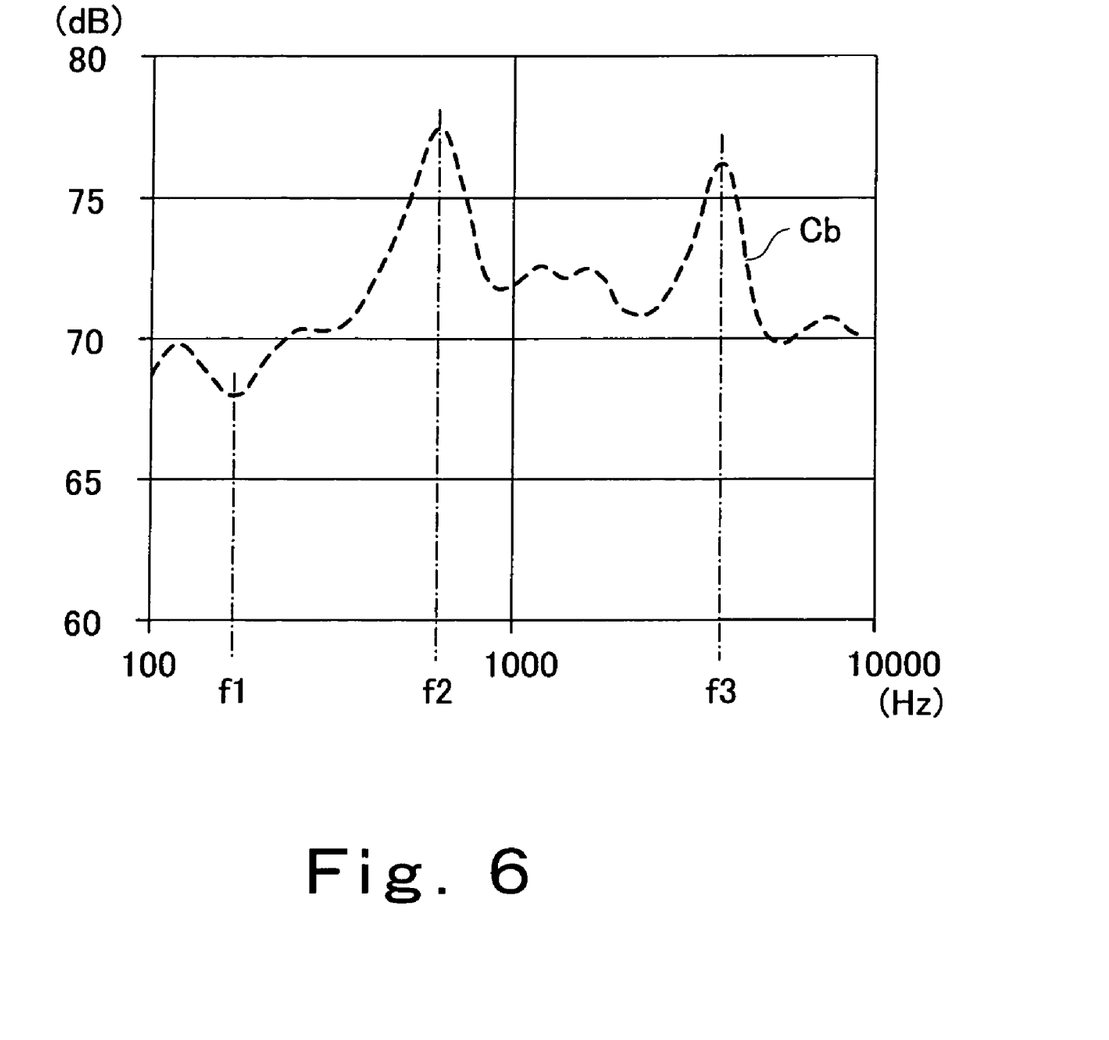
FIG. 6 is a view of a frequency characteristic obtained by extracting the curve Cb from the frequency characteristic in FIG. 4.

FIG. 6 is a view of a frequency characteristic obtained by extracting only the curve Cb from FIG. 4. In FIG. 6, an ordinate axis and an abscissa axis are logarithmic axes. In FIG. 6, the ordinate axis indicates an amplitude level and an abscissa axis indicates a frequency. In the curve Cb of FIG. 6, the amplitude levels of the frequencies f1, f2, and f3 decrease in the order of f2, f3, and f1. If the number of frequencies to be selected as the candidate frequency is "three," then all the frequencies f1, f2, and f3 are candidate frequencies.

For example, when a number of resonant frequencies are detected, only frequencies of a predetermined number may be selected as candidates of the center frequencies of the dip which are set in the dip filter 4 as the frequency to be removed, rather than all the detected frequencies. For example, when a number of (200 or more) resonant frequencies are detected, 120 frequencies may be selected as candidate frequencies, and the remainder may be excluded from the candidate frequencies. In this case, the candidate frequencies may be in preference selected in decreasing order of the amplitude levels in the curve Cb of FIG. 6.

Subsequently, the candidate frequencies (frequencies f1, f2, and f3) are arranged in decreasing order of the amplitude levels in the frequency characteristic curve Cc in FIG. 5. The amplitude levels in the curve Cc of FIG. 5 decrease in the order of f3, f2, and f1. Therefore, at this time, the frequency f3 is the first candidate frequency, the frequency f2 is the second frequency, and the frequency f1 is the third frequency.

Subsequently, a target amplitude frequency characteristic is obtained from the measurement values which the system A of FIG. 2 has measured at a number of points. The target amplitude frequency characteristic is obtained by smoothing the measurement values which the system A of FIG. 2 has measured at a number of frequency points on the frequency axis. The smoothing method may include, for example, moving average on the frequency axis. As described above, the measurement values measured at a number of frequency points by the system A of FIG. 2 may be smoothed on the frequency axis or not to obtain the curve Ca of FIG. 4 (basic amplitude frequency characteristic). But, the target amplitude frequency characteristic is found by smoothing such that its smoothness degree on the frequency axis is larger than that of the basic amplitude frequency characteristic. If the basic amplitude frequency characteristic is obtained by moving average of, for example 9 points on the frequency axis, it is necessary to obtain the target amplitude frequency characteristic by moving average of a window width larger than 9 points (e.g., 65 points). In this manner, the target amplitude frequency characteristic is objectively obtained without depending on experience.

Figure 7:
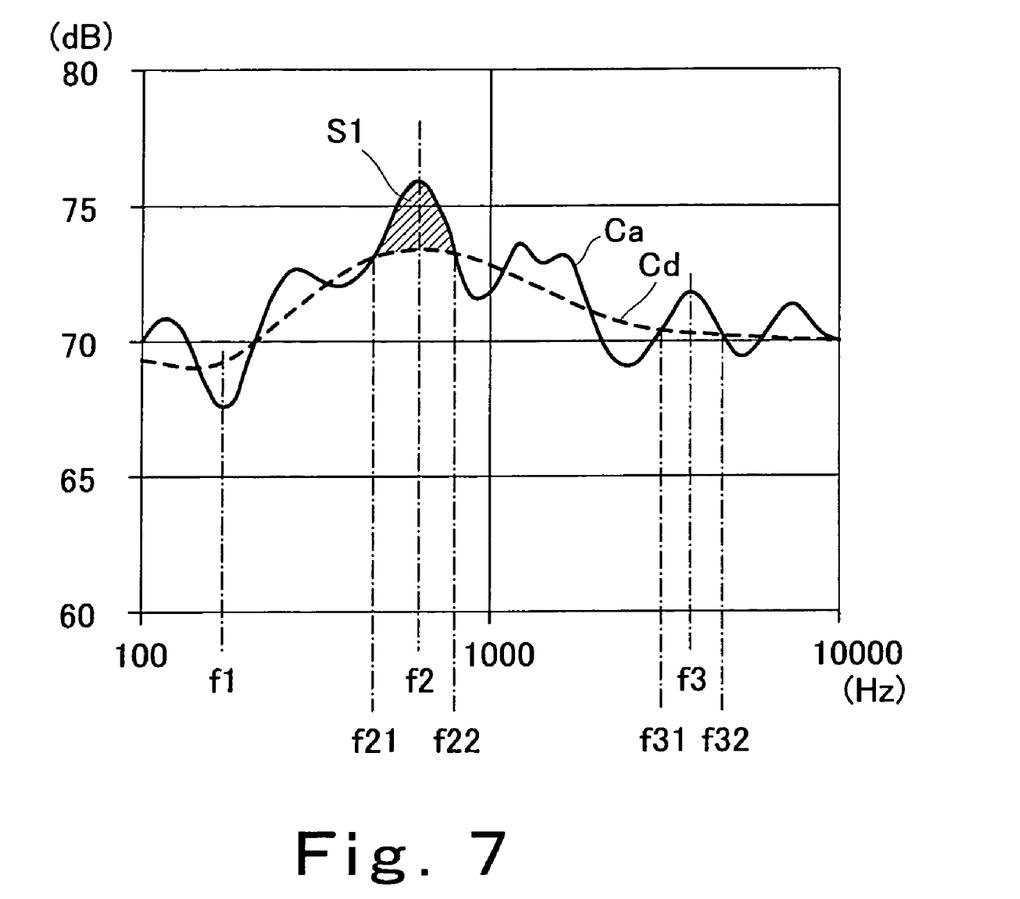
FIG. 7 is a view of a frequency characteristic showing a curve Ca of a basic amplitude frequency characteristic and a curve Cd of a target amplitude frequency characteristic.

In FIG. 7, the curve Ca extracted from FIG. 4 is illustrated. In FIG. 7, an ordinate axis and an abscissa axis are logarithmic axes. In FIG. 7, the ordinate axis indicates an amplitude level and an abscissa axis indicates a frequency. The curve Ca of FIG. 7 is identical to that of the curve Ca of FIG. 4. In FIG. 7, a broken line Cd is illustrated. The curve Cd is obtained by moving average of the amplitude values measured at a number of frequency points by the system A of FIG. 2 on the frequency axis. Since the window width for the moving average at this time is relatively larger, the smoothness degree of the curve Cd (target amplitude frequency characteristic) is much larger than that of the curve Ca (basic amplitude frequency characteristic).

The frequency f3, the frequency f2, and the frequency f1 have been selected as the first, second, and third candidate frequencies. Then, the frequencies at which the amplitude level of the basic amplitude frequency characteristic (curve Ca) is smaller than the amplitude level of the target amplitude frequency characteristic (curve Cd) are excluded from the candidate frequencies. As can be seen from FIG. 7, in the frequency f1, the amplitude level of the basic amplitude frequency characteristic (curve Ca) is smaller than the amplitude level of the target amplitude frequency characteristic (curve Cd). Therefore, the frequency f1 is excluded from the candidate frequencies. As a result, the frequencies f2 and f3 are selected as the candidate frequencies. Specifically, the frequency f3 is the first candidate frequency and the frequency f2 is the second candidate frequency.

Then, with reference to FIG. 7, frequency ranges in which the respective candidate frequencies are included and the curve Ca of the basic amplitude frequency characteristic continuously exceeds from the curve Cd of the target amplitude frequency characteristic on a positive side on the frequency axis are detected. As illustrated in FIG. 7, in the frequency f3 which is the first candidate frequency, the amplitude level is larger in the basic amplitude frequency characteristic than in the target amplitude frequency characteristic. In a range near the frequency f3 on the frequency axis of FIG. 7, a frequency f31 and a frequency f32 are detected as points at which the curve Ca of the basic amplitude frequency characteristic and the curve Cd of the target frequency characteristic cross each other. In the frequency f31 and the frequency f32, the curve Ca of the basic amplitude frequency characteristic and the curve Cd of the target amplitude frequency characteristic cross each other. The frequency f31 is closest to the frequency f3, among points at which the curve Ca of the basic amplitude frequency characteristic and the curve Cd of the target amplitude frequency characteristic cross each other in a frequency range lower than the frequency f3. The frequency f32 is closest to the frequency f3, among points at which the curve Ca of the basic amplitude frequency characteristic and the curve Cd of the target amplitude frequency characteristic cross each other in a frequency range higher than the frequency f3.

After detecting the frequency range (range from the frequency f31 to the frequency f32) in which the curve Ca of the basic amplitude frequency characteristic continuously exceeds from the curve Cd of the target amplitude frequency characteristic on the positive side (above) on the frequency axis, it is detected whether or not two or more candidate frequencies are included in this frequency range. If two or more candidate frequencies are included, one of them is selected as the candidate frequency and the remainder is excluded from the candidate frequencies. The frequency to be selected as the candidate frequency is determined based on the magnitude of the amplitude levels in the characteristic in FIG. 6 (second amplitude frequency characteristic (curve Cb)). Specifically, only the frequency with the highest amplitude level in the second amplitude frequency characteristic (curve Cb) is selected as the candidate frequency. As shown in FIG. 7, the frequency range from the frequency f31 to the frequency f32 includes only the frequency f3 as the candidate frequency, and therefore, no frequency is excluded.

The frequency f2 which is the candidate frequency is treated in the same manner. Specifically, a frequency range in which the frequency f2 is included and the basic amplitude frequency characteristic (curve Ca) continuously exceeds from the target amplitude frequency characteristic (curve Cd) on the positive side on the frequency axis is detected. As shown in FIG. 7, in a frequency range from the frequency f21 to the frequency f22, the basic amplitude frequency characteristic (curve Ca) exceeds continuously from the target amplitude frequency characteristic (curve Cd) on the positive side on the frequency axis. The frequency f2 is included in this frequency range. Then, it is detected that whether or not two or more candidate frequencies are included in this frequency range. There is no candidate frequency other than the frequency f2 in this frequency range. So, the frequency to be excluded does not exist in this frequency range.

Figure 8:
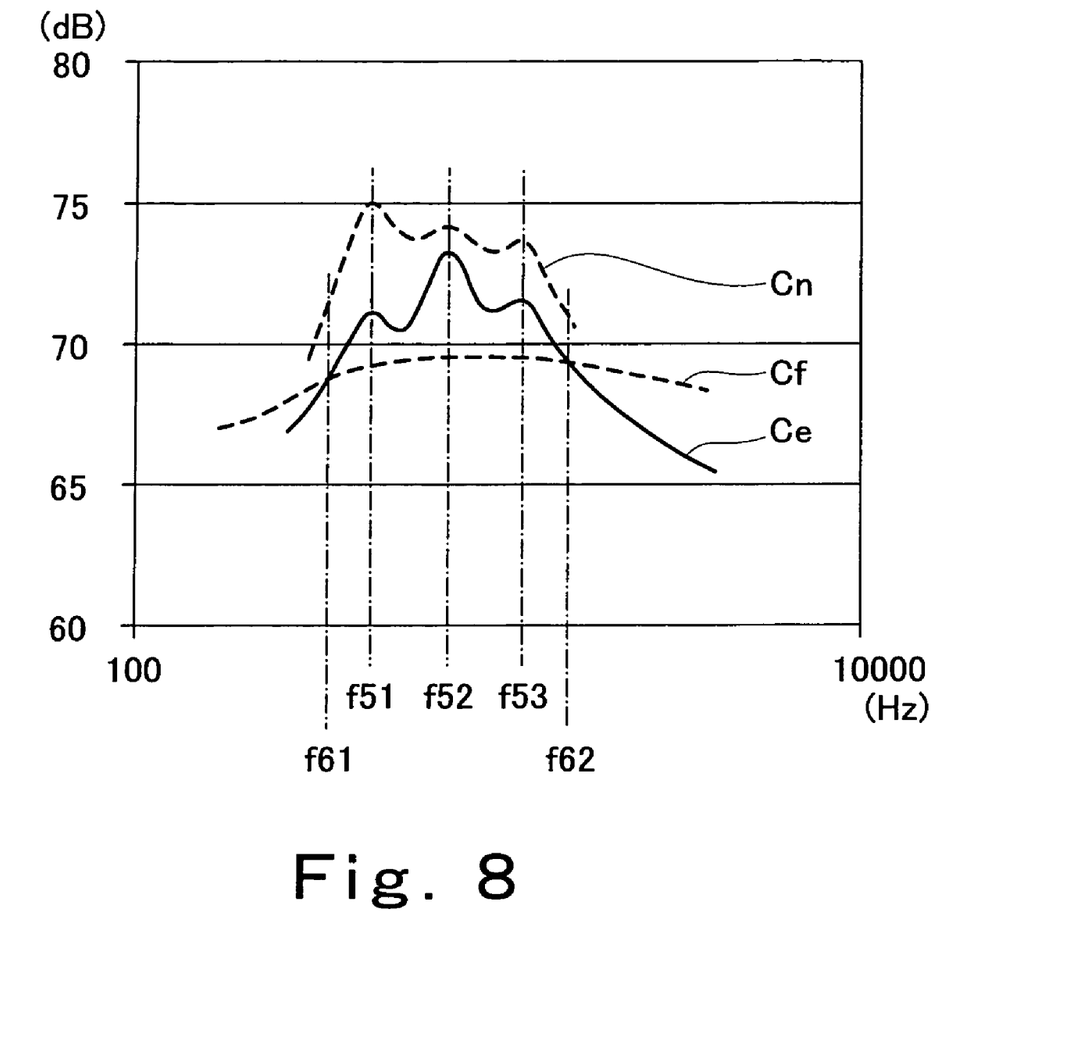
FIG. 8 is a view of a frequency characteristic showing three candidate frequencies in a frequency range from a frequency f61 to a frequency f62.

Subsequently, a case where plural candidate frequencies exist in such a frequency range will be described with reference to FIG. 8. In FIG. 8, a curve Ce indicates a basic amplitude frequency characteristic and a curve Cf indicates a target amplitude frequency characteristic. These curves cross each other at a frequency f61 and a frequency f62. Three candidate frequencies (frequency f51, frequency f52 and frequency f53) exist in this frequency range (frequency range from f61 to frequency f62).

In FIG. 8, a curve Cn indicates the second amplitude frequency characteristic, i.e., amplitude frequency characteristic obtained by outputting, from the speaker 13, a loud sound wave of a synthesized signal containing a measurement signal (sine wave sweep signal) and a signal output from the microphone 14 and by receiving the loud sound wave in the microphone 14. Among the frequency f51, the frequency f52, and the frequency f53, the amplitude level of the second amplitude frequency characteristic (curve Cn) of the frequency f51 is the largest. Therefore, only the frequency f51 is selected as the candidate frequency and the remaining frequencies (frequency f52 and frequency f53) are excluded from the candidate frequencies. This eliminates the possibility that the unwanted frequencies are selected as the candidate frequencies and hence are set in the dip filter 4.

It shall be understood that if there exists a frequency with a amplitude level difference between the basic amplitude frequency characteristic (curve Ce) and the second amplitude frequency characteristic (curve Cn) being a predetermined level or lower (e.g., 1 dB or lower) among the candidate frequencies (frequency f1, frequency f2 and frequency f3), this frequency is not set as the center frequency of the dip in the dip filter 4. While the second amplitude frequency characteristic (curve Cn) of the frequency f51 has the highest amplitude level among the frequency f51, the frequency f52, and the frequency f53, it is excluded from the candidate frequencies and the frequency f52 having the second highest amplitude level in the second amplitude frequency characteristic (curve Cn) is selected as the candidate frequency, if the amplitude level difference in the frequency f51 between the basic amplitude frequency characteristic (curve Ce) and the second amplitude frequency characteristic (curve Cn) is the predetermined level or lower (e.g., 1 dB or lower). As a matter of course, the frequency f53 is excluded from the candidate frequencies.

Thus far, the case where three frequencies exist as candidate frequencies in the frequency range has been described with reference to FIG. 8.

With reference to FIG. 7, the frequency ranges in which the candidate frequencies are included and the basic amplitude frequency characteristic (curve Ca) continuously exceeds from the target amplitude frequency characteristic (curve Cd) on the positive side on the frequency axis have been detected. As described above, two or more candidate frequencies do not exist in each of the detected frequency ranges, and therefore the frequency f2 and the frequency f3 are selected as the candidate frequencies.

Next, the remaining candidate frequencies are re-arranged in order as follows. The candidate frequencies are re-arranged in decreasing order of amplitude level difference between the basic amplitude frequency characteristic (curve Ca) and the target amplitude frequency characteristic (curve Cd). As can be seen from FIG. 7, the amplitude level difference in the frequency f2 between the basic amplitude frequency characteristic (curve Ca) and the target amplitude frequency characteristic (curve Cd) is 2.5 dB, and the amplitude level difference in the frequency f3 between the basic amplitude frequency characteristic (curve Ca) and the target amplitude frequency characteristic (curve Cd) is 1.8 dB. Therefore, the candidate frequencies are re-arranged in order such that the frequency f2 is the first candidate frequency and the frequency f3 is the second candidate frequency.

The frequency f2 which is the first candidate frequency is determined as the center frequency of the dip (frequency to be removed) in the dip filter 4. Subsequently, a procedure by which a damping level (depth) and quality factor (Q) of the dip in the frequency to be removed is determined will be described.

First of all, an area of an area S1 defined by the curve Ca of the basic amplitude frequency characteristic and the curve Cd of the target amplitude frequency characteristic in the frequency range from the frequency f21 to the frequency f22 in FIG. 7 is detected. In FIG. 7, the area S1 is illustrated as being hatched. Here, it is assumed that area of the detected area S1 is T1.

Then, the magnitude of the amplitude level difference in the frequency f2 between the target amplitude frequency characteristic (curve Cd) and the basic amplitude frequency characteristic (curve Ca) is detected and is assumed as the damping level (depth) of the dip filter 4. The amplitude level difference in the frequency f2 between the target amplitude frequency characteristic (curve Cd) and the basic amplitude frequency characteristic (curve Ca) is 2.5 dB, and the dip depth is assumed to be 2.5 dB.

Then, the quality factor (Q) of the dip is assumed to be 40. And, an area of the dip is calculated from a shape of the dip (shape of the dip in the amplitude frequency characteristic view) obtained from the assumed dip depth and quality factor.

Figure 9:
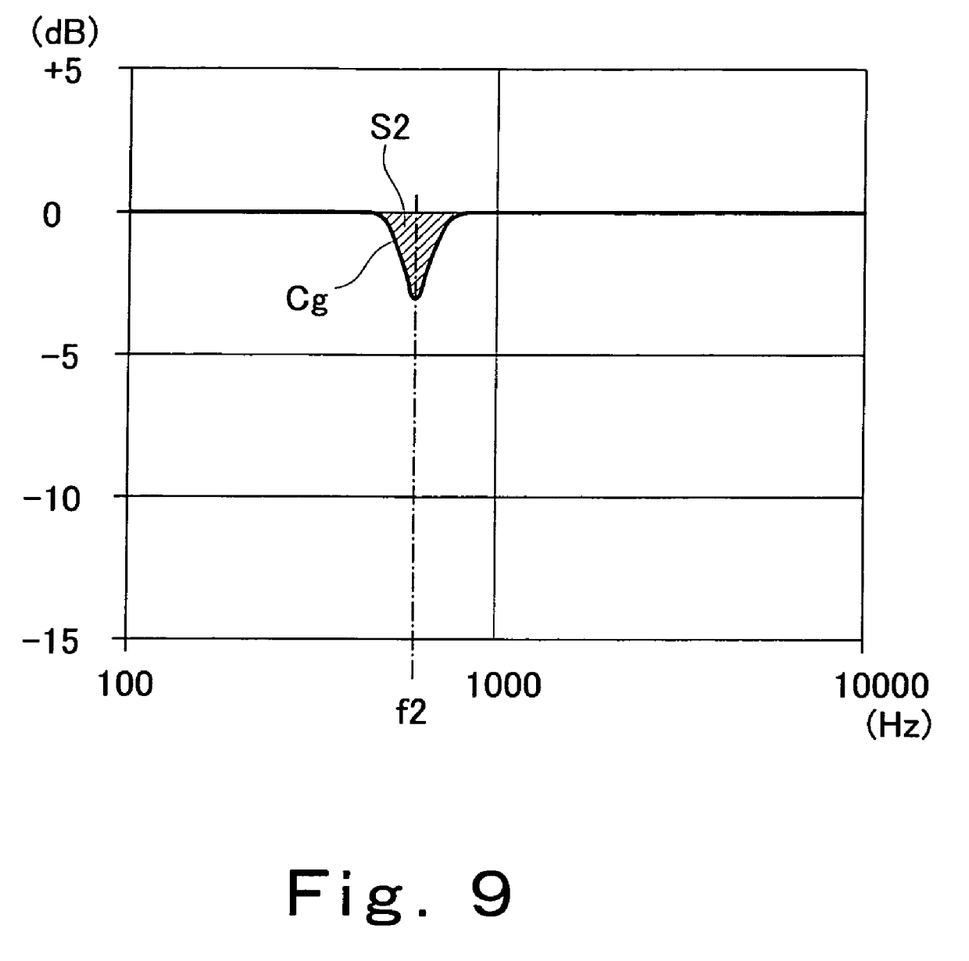
FIG. 9 is a view showing an amplitude frequency characteristic of a dip in which a center frequency is a frequency f2.

In FIG. 9, a curve Cg represents an amplitude frequency characteristic of the dip in which the center frequency is the frequency f2. In FIG. 9, an ordinate axis and an abscissa axis are logarithmic axes and indicate an amplitude level and a frequency, respectively. In FIG. 9, an area of the area S2 hatched by a number of parallel oblique lines is the area of the dip. Here it is assumed that the area of the dip calculated from the assumed depth and quality factor of the dip is T2. The area T1 is compared to the area T2. If the area T2 is equal to or larger than the area T1, then the assumed damping level and quality factor are determined as the damping level and quality factor of the dip in the frequency to be removed in the dip filter 4.

If the area T2 is smaller than the area T1, the quality factor is decreased by 0.1 and the area T2 is found. And, the area T1 is compared to the area T2 again. If the area T2 is equal to or larger than the area T2, then the assumed damping level and quality factor are determined as the damping level and quality factor of the dip in the frequency to be removed in the dip filter 4. Conversely, if the area T2 is smaller than the area T1, the quality factor is decreased by 0.1 and the area T2 is found. Again, the area T1 is compared to the area T2. Thereafter, the quality factor is decreased by 0.1 until the area T2 becomes equal to or larger than the area T1 in the same manner, and the damping level and quality factor with the area T2 being equal to or larger than the area T1 are determined as the damping level and quality factor of the dip in the frequency to be removed in the dip filter 4.

If the area T2 is still smaller than the area T1 even when the quality factor is decreased to a predetermined value (e.g., 1.5), the damping level is thereafter increased by a predetermined value (e.g., 0.5 dB) without decreasing the quality factor. The damping level and quality factor with the area T2 being equal to or larger than the area T1 are determined as the damping level and quality factor of the dip in the frequency to be removed in the dip filter 4.

Furthermore, if the area T2 is still smaller than the area T1 even when the damping level is increased up to a predetermined value (e.g., 12 dB), the damping level and quality factor at that point are determined as the damping level and quality factor of the dip in the frequency to be removed in the dip filter 4.

In the manner as described above, based on the frequency f2 which is the first candidate frequency, the first frequency to be removed (center frequency of dip) which is to be set in the dip filter 4, and the damping and quality factor of the frequency are determined.

Then, based on the frequency f3 which is the second candidate frequency, the second frequency to be removed (center frequency of dip) which is to be set in the dip filter 4, and the damping and quality factor of the frequency are determined by a similar procedure.

Since the frequency f1 has been already excluded from the candidate frequencies, the frequencies to be removed (center frequency of dip) which are to be set in the dip filter 4 are the frequency f2 and the frequency f3.

When there are a number of candidate frequencies, the frequencies to be removed (e.g., 12 frequencies to be removed) which are capable of being set in the dip filter 4 are determined by a similar procedure. If all of the frequencies to be removed (e.g., 12 frequencies to be removed) which are capable of being set in the dip filter 4 are set in the dip filter 4, the remaining candidate frequencies are not set in the dip filter 4 as the frequencies to be removed.

In the manner as described above, the frequencies f2 and f3 to be set in the dip filter 4 as the frequencies to be removed, and the damping levels (depth) and the quality factor (Q) of the dips in those frequencies are determined. By setting these characteristics as the characteristics of the dip filter 4 in the acoustic system of FIG. 1, resonance in the loud sound space 40 is prevented.

As described above, the area of the dip of the dip filter 4 is substantially equal to the area formed by exceeding the basic amplitude frequency characteristic from the target amplitude frequency characteristic, and in principle, the amplitude level difference in the resonant frequency (center frequency of dip) between the basic amplitude frequency characteristic and the target amplitude frequency characteristic is set as the damping level of the dip of the dip filter 4. By applying the characteristic of the dip filter 4 to the basic amplitude frequency characteristic, a characteristic which is extremely near the target amplitude frequency characteristic is achieved. Therefore, the acoustic system of FIG. 1 including the dip filter 4 having such a characteristic has an appropriate characteristic capable of preventing resonance without degrading a sound quality.

Thus far, with reference to FIGS. 1 through 9, the method of determining the frequency characteristic of the dip filter according to an embodiment of the present invention has been described.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

In accordance with a method of determining a frequency characteristic of a dip filter of the present invention, a characteristic of the dip filter is appropriately determined without a need for experience or skills, and therefore are advantageous in technical fields of acoustic equipment.

The invention claimed is:

1. A method of determining one or both of a damping level and a quality factor of a dip filter adapted to remove a component of a resonant frequency based on the one or both of the damping level and the quality factor, the method comprising:

determining the resonant frequency detected in a resonant space as a center frequency of a dip;

finding a basic amplitude frequency characteristic based on a measurement value obtained by outputting a loud sound wave of a predetermined measurement signal from a speaker placed in the resonant space and by receiving the loud sound wave in a microphone placed in the resonant space;

finding a target amplitude frequency characteristic having a smoothness degree on a frequency axis which is larger than a smoothness degree of the basic amplitude frequency characteristic on the frequency axis, based on the measurement value;

identifying as a first frequency a frequency closest to the center frequency of the dip among frequencies at which a curve of the basic amplitude frequency characteristic and a curve of the target amplitude frequency characteristic cross each other, the first frequency being lower than the center frequency of the dip;

identifying as a second frequency a frequency closest to the center frequency of the dip among frequencies at which the curve of the basic amplitude frequency characteristic and the curve of the target amplitude frequency characteristic cross each other, the second frequency being higher than the center frequency of the dip;

defining as a first area an area having an outline defined by the curve of the basic amplitude frequency characteristic and the curve of the target amplitude frequency characteristic in a frequency between the first frequency and the second frequency, inclusive, when the curve of the basic and target amplitude frequency characteristics are represented in an amplitude frequency characteristic view in which a logarithm axis indicating an amplitude level is an ordinate axis and an axis indicating a frequency is an abscissa axis; and defining as a second area an area of the dip formed when an characteristic of the dip is represented on the amplitude frequency characteristic;

determining the one or both of the damping level and the quality factor of the dip based on a difference between the basic amplitude frequency characteristic and the target amplitude frequency characteristic in the center frequency and a frequency near the center frequency; and setting the dip filter to the determined resonant frequency and the determined one or both of the damping level and the quality factor so that the dip filter operates to remove the component of the resonant frequency;

wherein the center frequency of the dip is determined in such a manner that a resonant frequency with the highest amplitude level of a second amplitude frequency characteristic is set as the center frequency of the dip among plural resonant frequencies and remaining resonant frequencies are not set as the center frequency of the dip when the plural resonant frequencies detected in the resonant space are included in the frequency range from the first frequency to the second frequency;

wherein the second amplitude frequency characteristic is obtained by outputting, from the speaker, a loud sound wave of a synthesized signal containing the measurement signal and a signal output from the microphone and by receiving the loud sound wave in the microphone; and wherein the one or both of the damping level or quality factor of the dip are determined so as to make the second area substantially equal to the first area.

2. A method of determining one or both of a damping level and a quality factor of a dip filter adapted to remove a component of a resonant frequency based on the one or both of the damping level and the quality factor, the method comprising:

determining the resonant frequency detected in a resonant space as a center frequency of a dip;

finding a basic amplitude frequency characteristic based on a measurement value obtained by outputting a loud sound wave of a predetermined measurement signal from a speaker placed in the resonant space and by receiving the loud sound wave in a microphone placed in the resonant space;

finding a target amplitude frequency characteristic having a smoothness degree on a frequency axis which is larger than a smoothness degree of the basic amplitude frequency characteristic on the frequency axis, based on the measurement value;

determining as a first amplitude frequency characteristic an amplitude frequency characteristic which is obtained by outputting, from a speaker placed in the resonant space, a sound wave of a predetermined measurement signal and by receiving the sound wave in a microphone placed in the resonant space;

determining as a second amplitude frequency characteristic an amplitude frequency characteristic which is obtained by outputting, from the speaker, a loud sound wave of a synthesized signal containing the measurement signal and a signal output from the microphone and by receiving the loud sound wave in the microphone;

determining the one or both of the damping level and the quality factor of the dip based on a difference between the basic amplitude frequency characteristic and the target amplitude frequency characteristic in the center frequency and a frequency near the center frequency; and setting the dip filter to the determined resonant frequency and the determined one or both of the damping level and the quality factor so that the dip filter operates to remove the component of the resonant frequency;

wherein the resonant frequency in the resonant space is detected based on comparison of the first amplitude frequency characteristic and the second amplitude frequency characteristic.

3. The method of claim 2, wherein a peak frequency at which an amplitude of the second amplitude frequency characteristic is larger than an amplitude of the first amplitude frequency characteristic is detected as the resonant frequency in the resonant space, from a difference between the first amplitude frequency characteristic and the second amplitude frequency characteristic.

* * * * *